US012673710B2

(12) United States Patent (10) Patent No.: US 12,673,710 B2
Luo (45) Date of Patent: Jul. 7, 2026

(54) FOLDABLE CART

(71) Applicant: Phaeton Manufacturing LLC, Nantong (CN)

(72) Inventor: Xiong Luo, Nantong (CN)

(73) Assignee: Phaeton Manufacturing LLC, Nantong (CN)

( * ) Notice: Subject to any disclaimer, the term of this patent is extended or adjusted under 35 U.S.C. 154(b) by 438 days.

(21) Appl. No.: 18/495,842

(22) Filed: Oct. 27, 2023

(65) Prior Publication Data

US 2024/0217572 A1 Jul. 4, 2024

(30) Foreign Application Priority Data

Dec. 29, 2022 (CN) .......................... 202211708560.3

(51) Int. Cl.
*B62B 3/02* (2006.01)
*B62B 3/00* (2006.01)
*B62B 5/06* (2006.01)
(52) U.S. Cl.
CPC .............. *B62B 3/022* (2013.01); *B62B 3/005* (2013.01); *B62B 3/007* (2013.01); *B62B 5/067* (2013.01); *B62B 2205/06* (2013.01); *B62B 2205/104* (2013.01)
(58) Field of Classification Search
CPC . B62B 2205/06; B62B 2205/26; B62B 3/007; B62B 3/025; B62B 2202/68
See application file for complete search history.

(56) References Cited

U.S. PATENT DOCUMENTS

| 1,429,849 | A | * | 9/1922 | Dolge | ....................... | B62B 3/12 |
| | | | | | | 280/35 |
| 1,919,103 | A | * | 7/1933 | Dolge | ....................... | B62B 3/02 |
| | | | | | | 280/640 |
| 2,059,320 | A | * | 11/1936 | Dolge | ....................... | B62B 3/02 |
| | | | | | | 27/27 |
| 9,056,621 | B1 | * | 6/2015 | Jin | ........................... | B62B 3/027 |
| 9,409,665 | B1 | * | 8/2016 | Gregory | ................. | A63B 47/00 |
| 12,221,146 | B2 | * | 2/2025 | Yang | ....................... | B62B 5/067 |
| 2022/0041199 | A1 | * | 2/2022 | Tong | ....................... | B62B 3/025 |
| 2022/0340183 | A1 | * | 10/2022 | Sun | ......................... | B62B 3/025 |
| 2023/0049293 | A1 | * | 2/2023 | Wu | .......................... | B62B 3/007 |
| 2024/0190492 | A1 | * | 6/2024 | Frankel | .................. | B62B 3/007 |
| 2024/0270298 | A1 | * | 8/2024 | Song | ....................... | B62B 5/067 |
| 2025/0333089 | A1 | * | 10/2025 | Lin | ........................... | B62B 3/02 |

FOREIGN PATENT DOCUMENTS

| CN | 116476902 A | * | 7/2023 | ............... | B62B 3/02 |
| CN | 117087730 A | * | 11/2023 | ............... | B62B 3/02 |

* cited by examiner

*Primary Examiner* — Emma K Frick
(74) *Attorney, Agent, or Firm* — Wang Law Firm, Inc.

(57) ABSTRACT

The foldable cart comprises a handle assembly, four vertical rods, a wheel frame assembly, a plurality of wheels and a storage bag. Each vertical rod is connected to the wheel frame assembly; the wheel frame assembly is in an X-shaped foldable structure, the storage bag is connected to the four vertical rods, and, the lower end of the handle assembly is rotatably connected to the bottom ends of the two vertical rods on the corresponding side of the cart frame and is foldable with the two vertical rods. The foldable cart of the present invention is simple and reasonable in structure, small in size after being folded and convenient to store and carry.

10 Claims, 7 Drawing Sheets

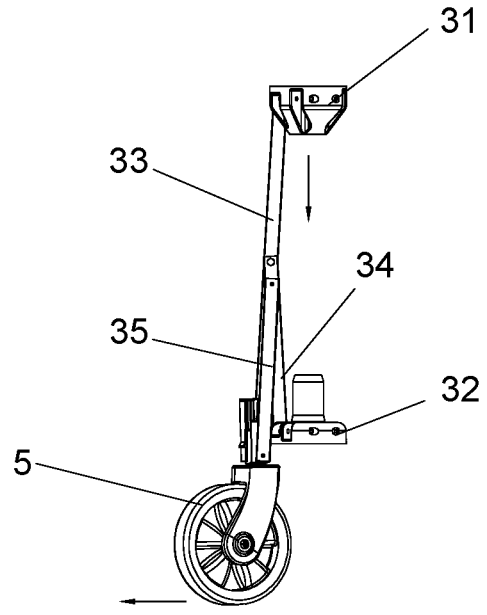
FIG.8a
FIG.8b
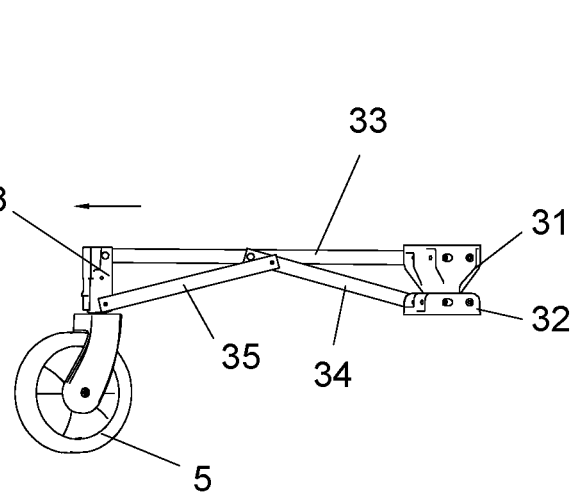
FIG.8c
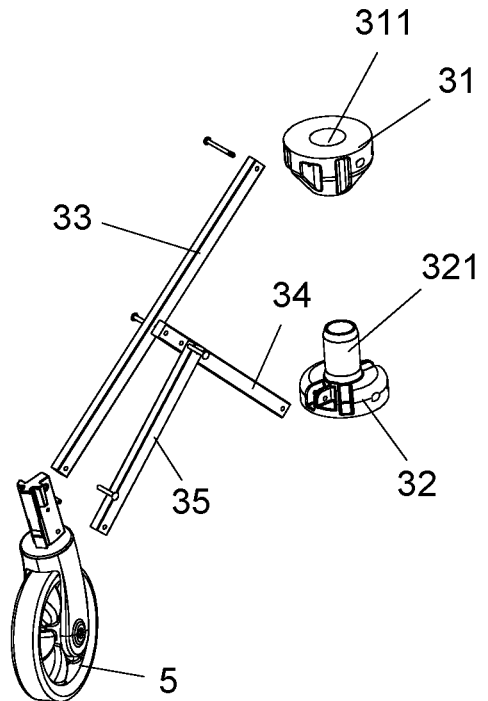
FIG.8d front⟷ rear front⟷ rear front⟷ rear front⟷ rear

FOLDABLE CART

TECHNICAL FIELD OF THE INVENTION

The present invention relates to a field of transportation tools, and relates to a cart, in particular to a foldable cart.

BACKGROUND OF THE INVENTION

As a kind of transportation tools commonly used in the daily life, carts are mainly classified into shopping carts and transport carts, where the shopping carts are used for shopping, going out and other occasions. The cart mainly consists of a bracket, casters and a bearing. The transport cart is an agricultural transportable tool, and mainly comprises three components, i.e., wheels, a cart frame and a brake. With the improvement of people's living standards, more activities such as family shopping, self-driving tour and camping become popular among people. Carts are widely applied in outdoor places such as squares, beaches, parks, and courtyards, bringing convenience for people to carry a large number of activity materials. However, common carts are large in size, non-foldable and inconvenient to carry and store. Therefore, at present, the carts are designed into foldable structures for the convenience of storage.

After searching, a Chinese Patent CN217553949U (patent NO.: CN202221606025.2) disclosed a foldable cart, comprising a hand pull rod and a cart frame, wherein wheels are mounted under the cart frame; the cart frame comprises bottom frame edges and upper frame edges; the bottom frame edges and the upper frame edges are connected through vertical rods; a middle rod is arranged in the middle of the bottom frame edges; and, folding mechanisms for folding are arranged at two ends of the middle rod. The cart can be easily folded to satisfy the user's requirements, but is inconvenient to operate and not small enough after being folded and cannot adjust casters, so that the flexibility in use is not unsatisfactory.

SUMMARY OF THE INVENTION

It is an object of the present invention to provide a foldable cart which is simple in structure, flexible and convenient to operate.

For achieving the above object, the foldable cart comprises a handle assembly having an upper end and a lower end; a foldable cart frame having a front side and a rear side, comprising four vertical rods each having a bottom end, and a wheel frame assembly; a plurality of wheels connected to the wheel frame assembly; a storage bag connected to the foldable cart frame; wherein, the bottom end of each vertical rod is connected to the wheel frame assembly, two of the four vertical rods form a frontal pair of vertical rods and are located at the front side of the foldable cart frame and the other two of the four vertical rods form a rear pair of vertical rods and are located at the rear side of the foldable cart frame, both the frontal pair and rear pair of vertical rods are connected to a corresponding pair of crossed rotatable drawing rods such that the vertical rods of each pair can move closer to or further away from each other; the wheel frame assembly having four corners is in an X-shaped foldable structure, the bottom end of each vertical rod is connected to one of each of the four corners of the wheel frame assembly, and the cart frame is capable of being folded or opened through folding or opening of the wheel frame assembly; each wheel is mounted under a corresponding corner of the wheel frame assembly, the storage bag is connected to the four vertical rods, the handle assembly is arranged at the front or rear side of the cart frame, and, the lower end of the handle assembly is rotatably connected to the bottom ends of the two vertical rods on the corresponding side of the cart frame and is foldable with the two vertical rods.

Preferably, the wheel frame assembly comprises an upper nest, a lower nest, four long rods each having a first end, a second end and a middle portion, four corresponding short rods having a first end and a second end, four corresponding support rods having a first end and a second end and four corresponding joints having an upper portion, a lower portion and a bottom; the first end of each long rod is pivotally attached to the upper nest and the second end thereof is pivotally attached to the upper portion of the corresponding joint, the first end of each corresponding short rod is pivotally attached to the middle portion of the corresponding long rod and the second end thereof is pivotally attached to the lower nest, the first end of each support rod is pivotally attached to the lower portion of the corresponding joint and the second end thereof is pivotally attached to the corresponding short rod, each wheel is mounted on the bottom of the corresponding joint.

Preferably, the lower nest has a positioning column protruding upward on a top of the lower nest, and the upper nest has a hole at a bottom of the upper nest for receiving the positioning column; when the wheel frame assembly is opened, the positioning column is located inside the hole so as to lock the upper nest and the lower nest with each other, and the four long rods are located in a substantially same horizontal plane forming an X shape, and each second end of each of the four long rods defines a corner of the wheel frame assembly.

Preferably, the cart has four wheels each of which is an omni-directional wheel, each wheel is adjustably mounted under the corresponding joint, a connecting cylinder having an upper end and a lower end is convexly arranged at an upper surface of a seat of each universal wheel, and the bottom of each joint has a recessed hole for receiving the connecting cylinder; the connecting cylinder has an annular groove formed on a periphery of the upper end of the connecting cylinder, and each joint has a mounting hole formed at a position corresponding to the annular groove, a fastener passes through the mounting hole to press against the annular groove; the connecting cylinder has a radially formed fixation hole below the annular groove, and each joint has a corresponding positioning hole on a surface of the joint, an adjustment bolt screws through the positioning hole into the fixation hole so as to direct the corresponding wheel.

Preferably, each corner of the wheel frame assembly is detachably connected to each vertical rod, and the four vertical rods are symmetrically arranged in front, rear, left and right side of the cart frame.

Preferably, the lower end of the vertical rod has a chuck, the wheel frame assembly is detachably connected to the vertical rod through the cooperation of the joint and the chuck, a T-shaped guide rail is longitudinally formed at an upper portion of the surface of the joint, a lower portion of the surface of the joint is slotted to form a strip-shaped plate with certain elasticity, and a buckle is convexly arranged in a middle portion of the strip-shaped plate, an inner wall of the chuck has a guide slot which slides to fit with the T-shaped guide rail, and an inner wall of the guide slot has a recessed clamping slot which fits to the buckle, the chuck inserts with the joint by sliding the guide slot and the T-shaped guide rail together, and the chuck connects to the joint when the clamping slot attaches to the buckle.

Preferably, a slider that can slide along the vertical rod is sleeved on each vertical rod, the drawing rod has an upper end, a middle portion and a lower end, the middle portion of the two drawing rods on the same side are pivotally attached to each other, the upper end of the drawing rod is pivotally attached to the slider, while the lower end thereof is pivoted to the chuck at the lower end of the opposite corresponding vertical rod, and, a limiting block for limiting the downward movement of each slider is mounted on each vertical rod.

Preferably, the handle assembly comprises a handle, a telescopic rod having a top, a center block and two pull rods having an upper end and a lower end, the telescopic rod penetrates through a center of the center block in such a way that the telescopic rod is able to slide through the center block, the handle is arranged on the top of the telescopic rod, each chuck at the lower end of the corresponding vertical rod on the front side or the rear side of the foldable cart is pivotally attached to an adaptor, and, the lower end of each pull rod is pivotally attached to the corresponding adaptor, while the upper end thereof is pivotally attached to the center block.

Preferably, the center block is a rectangular block with openings corresponding to each pull rod, there are two telescopic rods arranged parallel to each other, a middle of the center block has a through hole for allowing the tele-scopic rods to pass and slide therethrough, a block resisted against each opening is arranged at the lower ends of the telescopic rods, each opening for allowing the upper end of the pull rod to be inserted is concavely formed on each side of the center block, and the upper end of each pull rod is inserted into the corresponding opening to be pivotally connected to the center block.

Preferably, each adaptor is rotatably connected to the corresponding chuck at the lower portion of the surface of the chuck on the vertical rods located on the front side or rear side of the cart frame, a side of each adaptor has a U-shaped notch for allowing the lower end of the corresponding pull rod to be inserted, the lower end of each pull rod is inserted into the corresponding U-shaped notch to be pivotally connected to the adaptor, the handle having an upper end and a lower end is a C-shaped block, the lower end of the handle has insertion holes for allowing the upper ends of the two telescopic rods to be inserted, and, the handle is fixed to the telescopic rods through a fixation member.

Preferably, the storage bag is detachably connected to the vertical rods to form a storage assembly, and the wheel frame assembly is able to be placed in the storage assembly after being folded.

Compared with the prior art, the foldable cart of the present invention has following advantages. The folding mechanism of the foldable cart is integrated on the bottom of the cart, so that the size after being folded can be further reduced. The vertical rods and the wheel frame assembly can be detached conveniently, so that the whole cart frame can be folded as a whole, or can be folded after being disas-sembled, therefore the size is reduced and it is convenient to store and carry. The wheel frame assembly can also be folded and then placed in the storage assembly, and other outdoor articles can be placed in the spare space in the storage assembly. The omni-directional wheels can be flex-ibly adjusted, and the omni-directional wheels can be in a steering state or a directional state as long as the bolts are rotated and adjusted, so that the foldable cart enters a state where the four wheels are directional, a state where the front wheels are omni-directional and the rear wheels are direc-tional, a state where the front wheels are directional and the rear wheels are omni-directional, or a state where the four wheels are omni-directional, so as to adapt to different service environments or match different consumers' habits. The foldable cart of the present invention is simple and reasonable in structure design, small in size after being folded and convenient to store and carry, and the omni-directional wheels can be flexibly adjusted according to the use needs, so that it is flexibly and convenient to operate.

BRIEF DESCRIPTION OF THE DRAWINGS

FIG. 8a-8d show the wheel frame assembly how to assemble and how to be folded and to be opened according to the embodiment of the present invention, in detail, FIG. 8a shows the wheel frame assembly is in a folded state, FIG. 8b shows the wheel frame assembly begins to be opened, FIG. 8c shows the wheel frame assembly is in a wholly open state and FIG. 8d shows an exploded view of the wheel frame assembly;

DETAILED DESCRIPTION OF THE INVENTION

Figure 1:
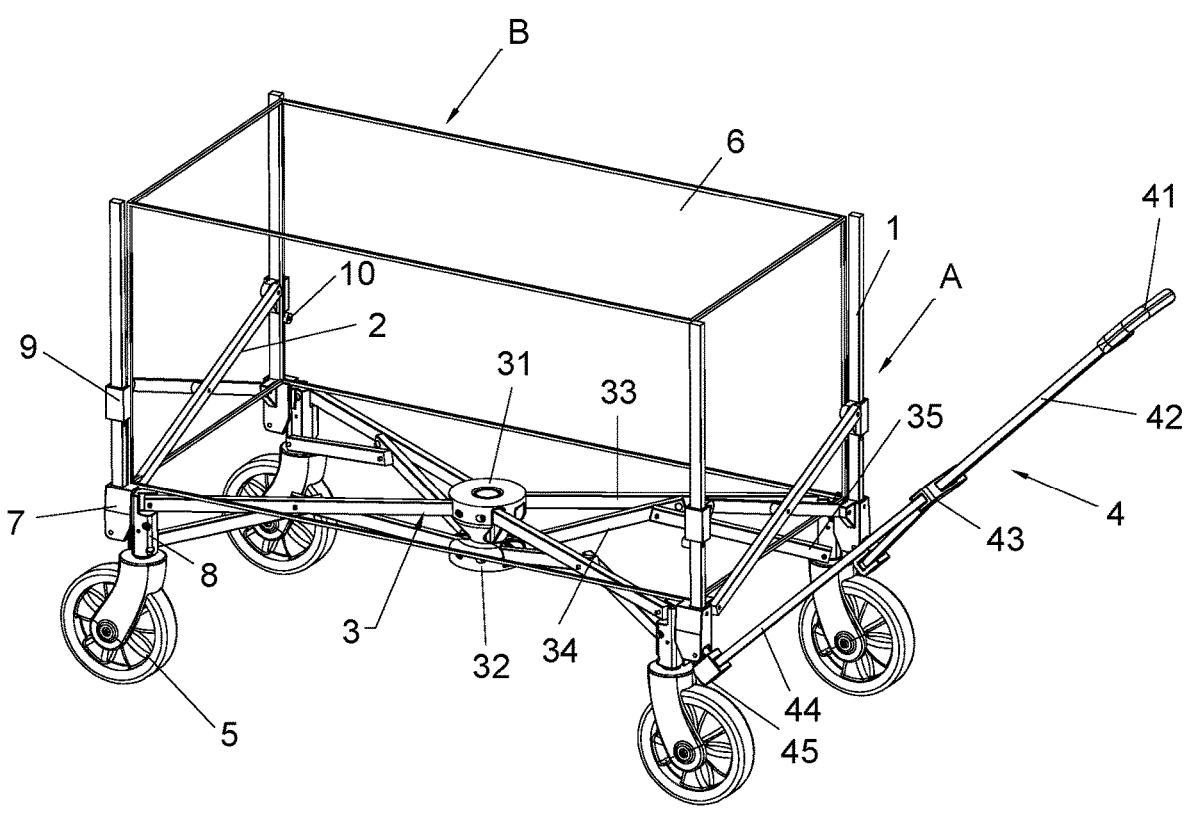
FIG. 1 is a perspective view of a foldable cart according to an embodiment of the present invention.
Figure 2:
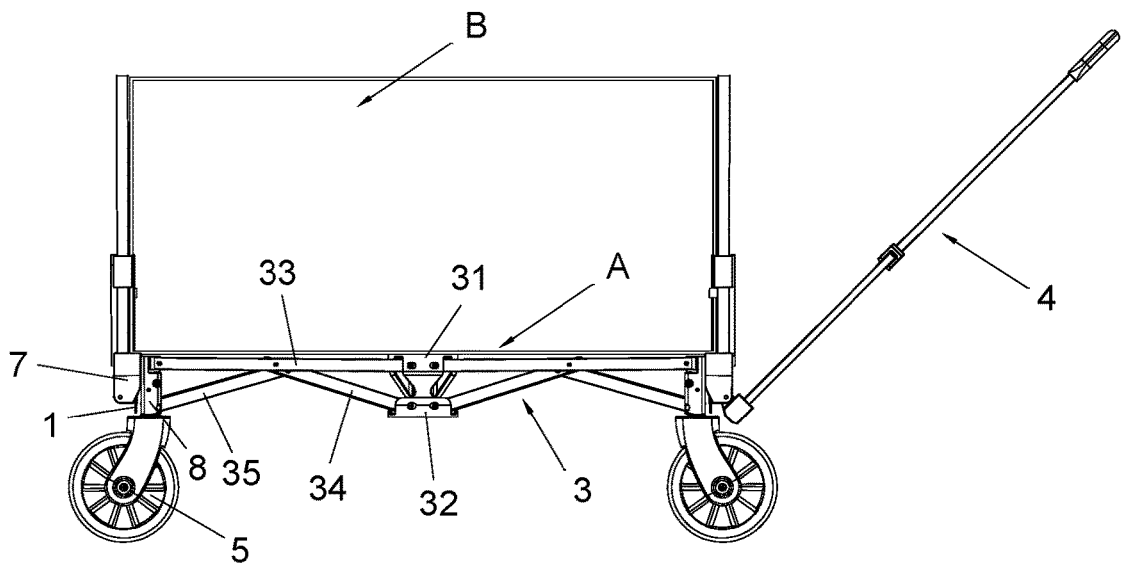
FIG. 2 is a front view of the foldable cart according to the embodiment of the present invention.
Figure 3:
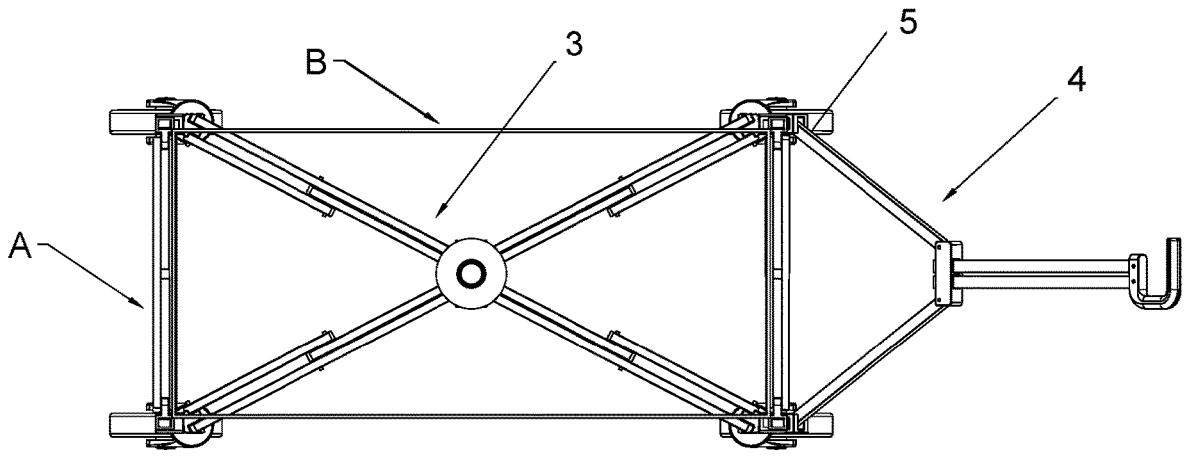
FIG. 3 is a top view of the foldable cart according to the embodiment of the present invention.
Figure 4:
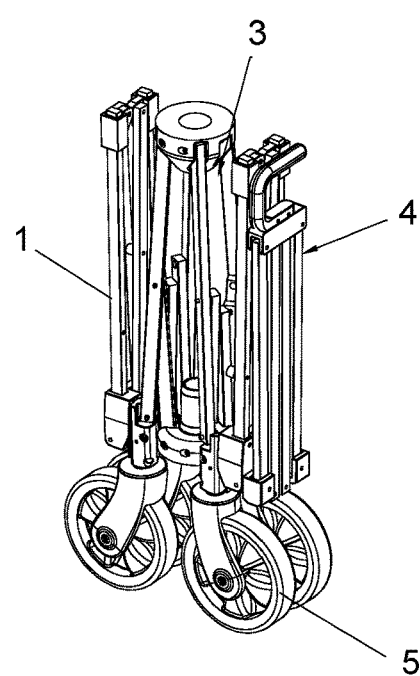
FIG. 4 is a perspective view of the foldable cart according to the embodiment of the present invention when in a folded state.

The present invention will be further described below in detail by embodiments with reference to the accompanying drawings.

As shown in FIGS. 1-14, the foldable cart comprises a handle assembly 4 having an upper end and a lower end, a foldable cart frame A having a front side and a rear side, four wheels 5 and a storage bag 6 connected to the foldable cart frame A.

The foldable cart frame A comprises four vertical rods 1 each having a bottom end, and a wheel frame assembly 3. The bottom end of each vertical rod 1 is connected to the wheel frame assembly 3, two of the four vertical rods 1 form a frontal pair of vertical rods and are located at the front side of the foldable cart frame A and the other two of the four vertical rods 1 form a rear pair of vertical rods and are located at the rear side of the foldable cart frame A, both the frontal pair and rear pair of vertical rods 1 are connected to a corresponding pair of crossed rotatable drawing rods 2 such that the vertical rods 1 of each pair can move closer to or further away from each other. The wheel frame assembly 3 having four corners is in an X-shaped foldable structure, the bottom end of each vertical rod 1 is detachably connected to one of each of the four corners of the wheel frame assembly 3, and the cart frame A is capable of being folded or opened through folding or opening of the wheel frame assembly 3. The foldable cart has four wheels 5 each of which is an omni-directional wheel, each wheel 5 is adjustably mounted under a corresponding corner of the wheel frame assembly 3 inside the foldable cart frame A. The storage bag 6 is detachably connected to the four vertical rods 1, the handle assembly 4 is arranged at the front or rear side of the cart frame A, and, the bottom of the handle assembly 4 is rotatably connected to the bottom ends of the two vertical rods 1 on the corresponding side of the cart frame A and is foldable with the two vertical rods 1.

Furthermore, the wheel frame assembly 3 comprises an upper nest 31, a lower nest 32, four long rods 33 each having a first end, a second end and a middle portion, four corresponding short rods 34 having a first end and a second end, four corresponding support rods 35 having a first end and a second end and four corresponding joints 8 having an upper portion, a lower portion and a bottom; the first end of each long rod 33 is pivotally attached to the upper nest 31 and the second end thereof is pivotally attached to the upper portion of the corresponding joint 8, the first end of each corresponding short rod 34 is pivotally attached to the middle portion of the corresponding long rod 33 and the second end thereof is pivotally attached to the lower nest 32, the first end of each support rod 35 is pivotally attached to the lower portion of the corresponding joint 8 and the second end thereof is pivotally attached to the corresponding short rod 34, each wheel 5 is mounted on the bottom of the corresponding joint 8. The lower nest 32 has a positioning column 321 protruding upward on a top of the lower nest 32, and the upper nest 31 has a hole 311 at a bottom of the upper nest 31 for receiving the positioning column 321; when the wheel frame assembly 3 is opened, the positioning column 321 is located inside the hole 311 so as to lock the upper nest 31 and the lower nest 32 with each other, and the four long rods 33 are located in a substantially same horizontal plane forming an X shape, and each second end of each of the four long rods 33 defines a corner of the wheel frame assembly 3. The cart has four wheels 5 each of which is an omni-directional wheel, each wheel 5 is adjustably mounted under the corresponding joint 8, a connecting cylinder 51 having an upper end and a lower end is convexly arranged at an upper surface of a seat of each universal wheel 5, and the bottom of each joint 8 has a recessed hole for receiving the connecting cylinder 51; the connecting cylinder 51 has an annular groove 52 formed on a periphery of the upper end of the connecting cylinder 51, and each joint 8 has a mounting hole 84 formed at a position corresponding to the annular groove 52, a fastener a passes through the mounting hole 84 to press against the annular groove 52, so that the annular groove 52 is connected to the joint 8, thus preventing the universal wheels 5 from escaping from the joints 8; the connecting cylinder 51 has a radially formed fixation hole 53 below the annular groove 52, and each joint 8 has a corresponding positioning hole 85 on a surface of the joint 8, an adjustment bolt b screws through the positioning hole 85 into the fixation hole 85 so as to direct the corresponding wheel 5, thereby the rotation of the wheels 5 can be limited.

The bottom end of the vertical rod 1 has a chuck 7, the wheel frame assembly 3 is detachably connected to the vertical rod 1 through the cooperation of the joint 8 and the chuck 7, a T-shaped guide rail 81 is longitudinally formed at an upper portion of the surface of the joint 8, a lower portion of the surface of the joint 8 is slotted to form a strip-shaped plate 82 with certain elasticity, and a buckle 83 is convexly arranged in a middle portion of the strip-shaped plate 82, an inner wall of the chuck 7 has a guide slot 72 which slides to fit with the T-shaped guide rail 81, and an inner wall of the guide slot 72 has a recessed clamping slot 71 which fits to the buckle 83, the chuck 7 inserts with the joint 8 by sliding the guide slot 72 and the T-shaped guide rail 81 together, and the chuck 7 connects to the joint 8 when the clamping slot 71 attaches to the buckle 83. When it is necessary to disassemble the wheel frame assembly 3, the joint 8 can be detached from the chuck 7 by pressing down the strip-shaped plate 82 to detach the buckle 83 from the clamping slot 71. A slider 9 that can slide along the vertical rod 1 is sleeved on each vertical rod 1, the drawing rod 2 has an upper end, a middle portion and a lower end, the middle portion of the two drawing rods 2 on the same side are pivotally attached to each other, the upper end of the drawing rod 2 is pivotally attached to the slider 9, while the lower end thereof is pivoted to the chuck 7 at the lower end of the opposite corresponding vertical rod 1, and, a limiting block 10 for limiting the downward movement of each slider 9 is mounted on each vertical rod 1, so as to limit the maximum distance between the two vertical rods 1.

The handle assembly 4 comprises a handle 41, a telescopic rod 42 having a top, a center block 43 and two pull rods 44 having an upper end and a lower end, the telescopic rod 42 penetrates through a center of the center block 43 in such a way that the telescopic rod 42 is able to slide through the center block 43, the handle 41 is arranged on the top of the telescopic rod 42, each chuck 7 at the lower end of the corresponding vertical rod 1 on the front side or the rear side of the foldable cart is pivotally attached to an adaptor 45, and, the lower end of each pull rod is pivotally attached to the corresponding adaptor 45, while the upper end thereof is pivotally attached to the center block 43. the center block 43 is a rectangular block with openings 432 corresponding to each pull rod 44, there are two telescopic rods 42 arranged parallel to each other, a middle of the center block 43 has a through hole 431 for allowing the telescopic rods 42 to pass and slide therethrough, a block resisted against each opening 432 is arranged at the lower ends of the telescopic rods 42, each opening 432 for allowing the upper end of the pull rod 44 to be inserted is concavely formed on each side of the center block 43, and the upper end of each pull rod 44 is inserted into the corresponding opening 432 to be pivotally connected to the center block 43. Each adaptor 45 is rotatably connected to the corresponding chuck 7 at the lower portion of the surface of the chuck 7 on the vertical rods 1 located on the front side or rear side of the cart frame A, a side of each adaptor 45 has a U-shaped notch 451 for allowing the lower end of the corresponding pull rod 44 to be inserted, the lower end of each pull rod 44 is inserted into the corresponding U-shaped notch 451 to be pivotally connected to the adaptor 45, the handle 41 having an upper end and a lower end is a C-shaped block, the lower end of the handle 41 has insertion holes for allowing the upper ends of the two telescopic rods 42 to be inserted, and, the handle 41 is fixed to the telescopic rods 42 through a fixation member. The storage bag 6 is connected to the vertical rods 42 to form a storage assembly B, and the wheel frame assembly 3 is able to be placed in the storage assembly B after being folded. Generally, the storage bag 6 is made of a flexible material, such as cloth or plastics, and is in a hollow cuboid shape with a bottom. Each Cuff is disposed at one of each of the four corners of the cart, and sleeved on corresponding vertical rod 1. It is also possible that one of each of the four corners has binding belt bound on corresponding vertical rod 1.

Figure 5:
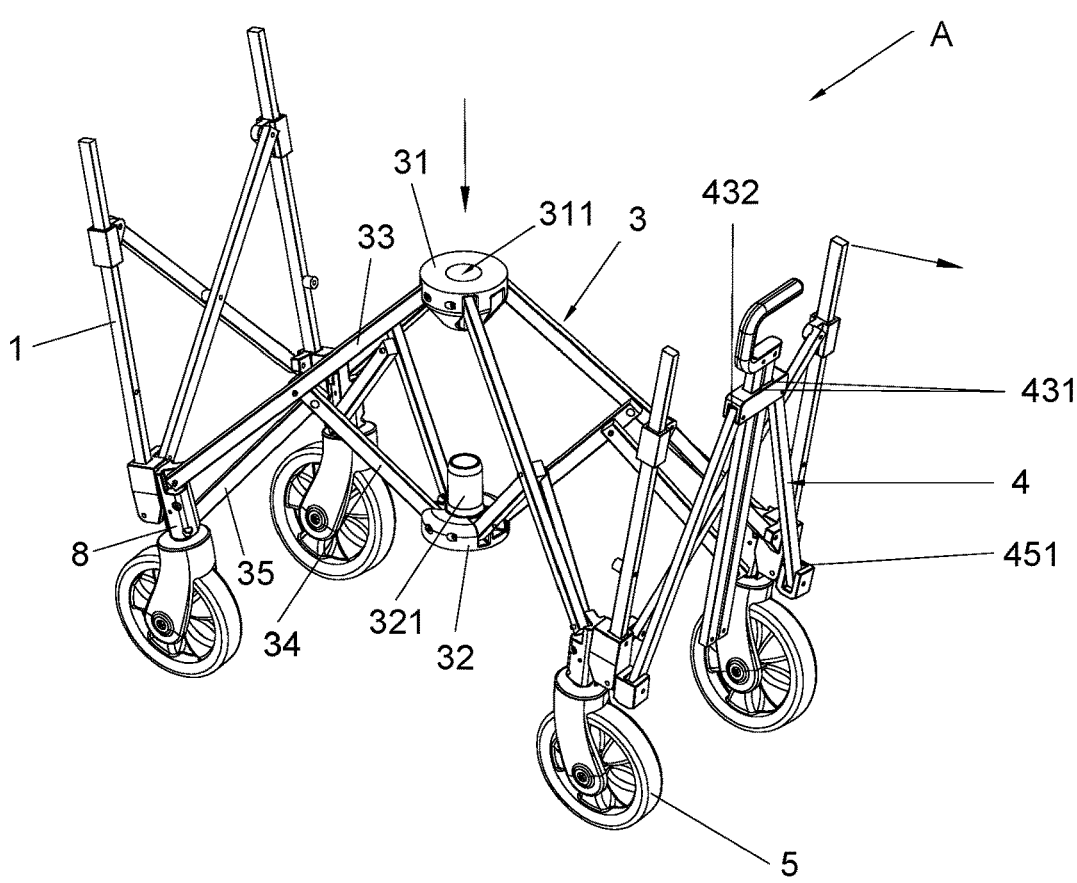
FIG. 5 is a perspective view of the foldable cart according to the embodiment of the present invention when in an open state.
Figure 6:
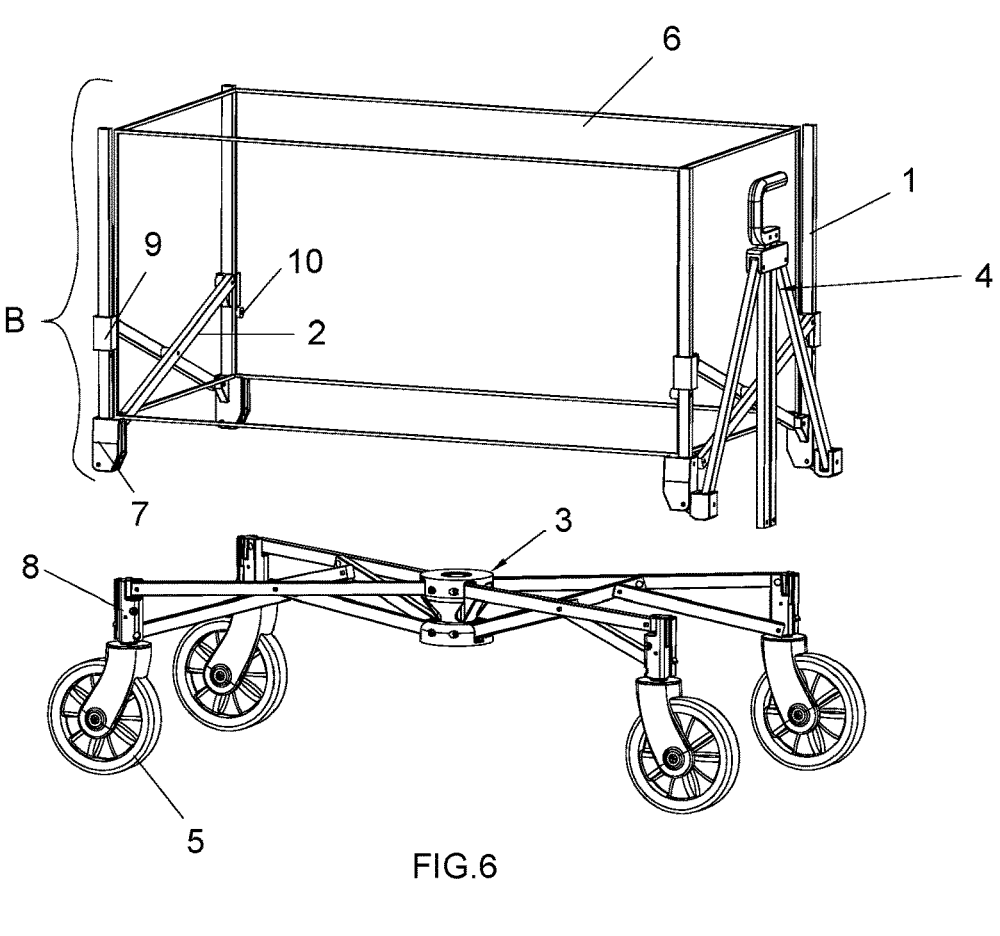
FIG. 6 is a perspective view of the foldable cart according to the embodiment of the present invention when a wheel frame assembly is separated from the foldable cart in an open state.
Figure 7:
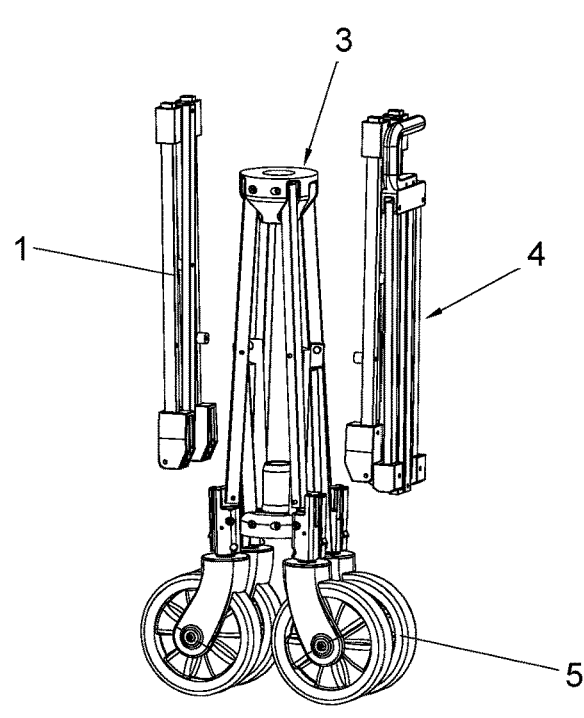
FIG. 7 is a perspective view of the foldable cart according to the embodiment of the present invention when the wheel frame assembly is separated from the vertical rods and the handle assembly which all in a folded state.
Figure 9:
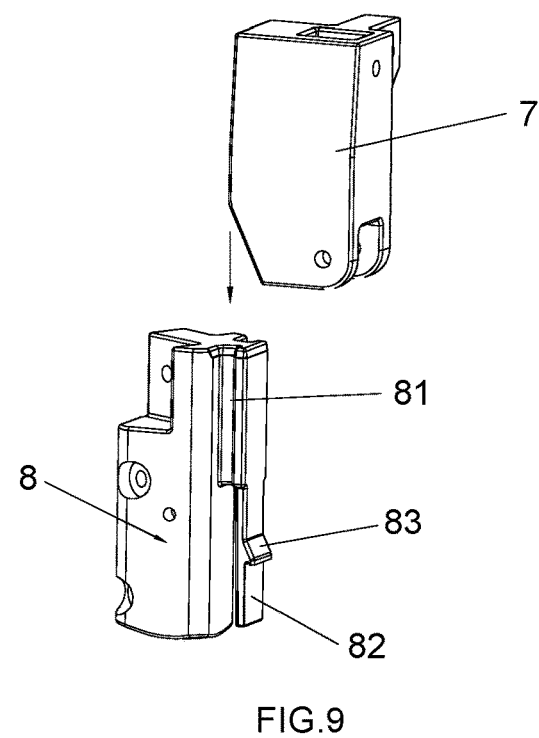
FIG. 9 is an exploded view of a chuck and a joint according to the embodiment of the present invention.
Figure 10:
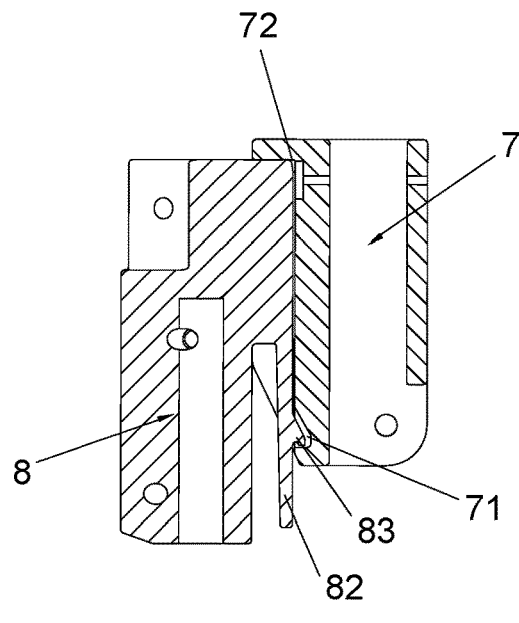
FIG. 10 is a sectional view of the chuck and the joint when they are assembled together.
Figure 11:
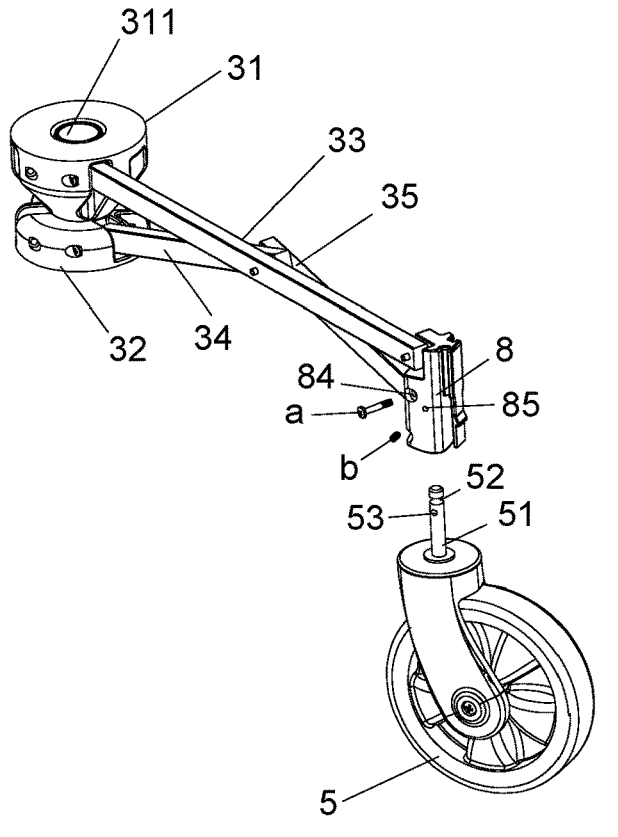
FIG. 11 is an exploded view of an omni-directional wheel and the joint according to the embodiment of the present invention.
Figure 12:
FIG. 12 is a perspective view of an upper end of the omni-directional wheel according to the embodiment of the present invention.

When in use, the foldable cart can be opened by pulling the vertical rods 1 in the radial direction of the upper nest 31 and pressing down the upper nest 31. As shown in FIG. 5, the telescopic rods 42 are pulled out of the center block 43 by pulling the handle 41, thus driving the foldable cart to move.

Figure 13A:
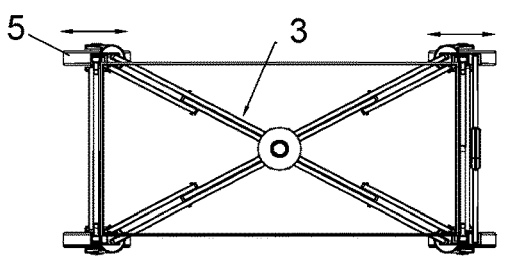
FIGS. 13a-13d show top views of the foldable cart when the four omni-directional wheels are adjusted in different states, in detail, in FIG. 13a the four wheels are single-directional, in FIG. 13b two front wheels are omni-direc-tional and two rear wheels are single-directional, in FIG. 13c two front wheels are single-directional and two rear wheels are omni-directional, and in FIG. 13d the four wheels are omni-directional.
Figure 13B:
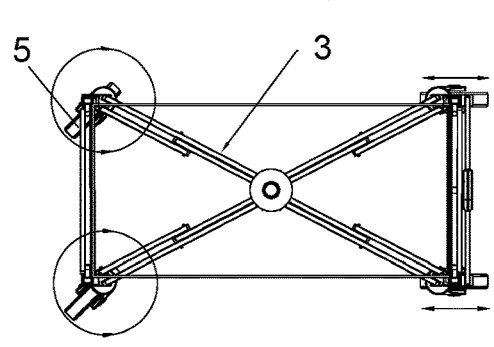
Figure 13C:
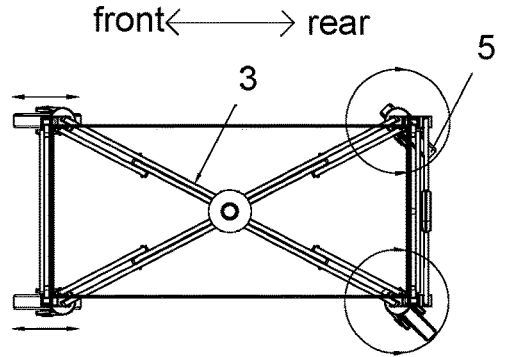
Figure 13D:
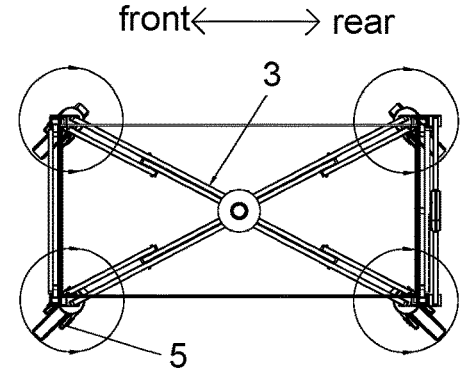

When the wheels 5 wants to be adjusted, the corresponding wheel 5 can be omni-directional by screwing the adjustment bolts b counterclockwise, and the corresponding wheel 5 can be single-directional by screwing the adjustment bolts b clockwise, so as to achieve different state of four wheels: the four wheels are single-directional (as shown in FIG. 13a), or two front wheels are omni-directional and two rear wheels are single-directional (as shown in FIG. 13b), or two front wheels are single-directional and two rear wheels are omni-directional (as shown in FIG. 13c) or the four wheels are omni-directional (as shown in FIG. 13d), to adapt to different service environments or reach different users' require.

Figure 14:
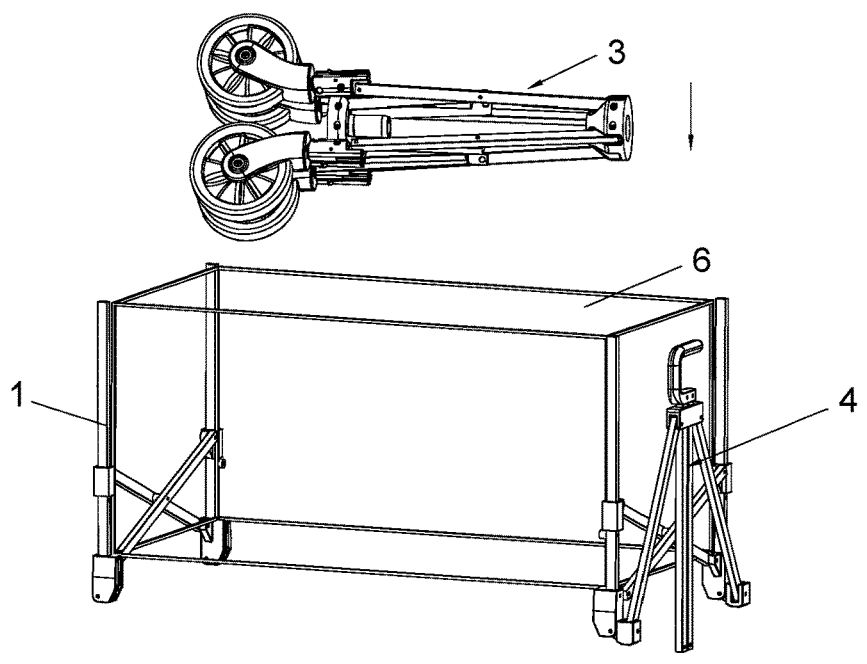
FIG. 14 is a perspective view showing how the folded wheel frame assembly is put into a storage packet according to the embodiment of the present invention.

During disassembling of the foldable cart for storage, the chuck 7 can be separated from the joint 8 by pressing the strip-shaped plates 82 with buckle 83. After the four joints 8 are all detached, the wheel frame assembly 3 is folded and placed in the storage assembly B, as shown in FIG. 14. Other outdoor articles can be placed in the spare space in the storage assembly B. The foldable cart can be placed in the trunk as a whole, and is convenient for users to operate.

The protection scope of the present invention is not limited to each embodiment described in this description. Any changes and replacements made on the basis of the scope of the present application and of the description shall be included in the scope of the present application.

The invention claimed is:

1. A foldable cart, comprising:

a handle assembly having an upper end and a lower end;

a foldable cart frame having a front side and a rear side, comprising four vertical rods each having a bottom end, and a wheel frame assembly;

a plurality of wheels connected to the wheel frame assembly;

a storage bag connected to the foldable cart frame; wherein, the bottom end of each vertical rod is connected to the wheel frame assembly, two of the four vertical rods form a frontal pair of vertical rods and are located at the front side of the foldable cart frame and the other two of the four vertical rods form a rear pair of vertical rods and are located at the rear side of the foldable cart frame, both the frontal pair and rear pair of vertical rods are connected to a corresponding pair of crossed rotatable drawing rods such that the vertical rods of each pair can move closer to or further away from each other;

the wheel frame assembly having four corners is in an X-shaped foldable structure, the bottom end of each vertical rod is connected to one of each of the four corners of the wheel frame assembly, and the cart frame is capable of being folded or opened through folding or opening of the wheel frame assembly;

the wheel frame assembly comprises an upper nest, a lower nest, four long rods each having a first end, a second end and a middle portion, four corresponding short rods having a first end and a second end, four corresponding support rods having a first end and a second end and four corresponding joints having an upper portion, a lower portion and a bottom;

each wheel is mounted under a corresponding corner of the wheel frame assembly, the storage bag is connected to the four vertical rods, the handle assembly is arranged at the front or rear side of the cart frame, and, the lower end of the handle assembly is rotatably connected to the bottom ends of the two vertical rods on the corresponding side of the cart frame and is foldable with the two vertical rods;

the first end of each long rod is pivotally attached to the upper nest and the second end thereof is pivotally attached to the upper portion of the corresponding joint, the first end of each corresponding short rod is pivotally attached to the middle portion of the corresponding long rod and the second end thereof is pivotally attached to the lower nest, the first end of each support rod is pivotally attached to the lower portion of the corresponding joint and the second end thereof is pivotally attached to the corresponding short rod, each wheel is mounted on the bottom of the corresponding joint.

2. The foldable cart of claim 1, wherein the lower nest has a positioning column protruding upward on a top of the lower nest, and the upper nest has a hole at a bottom of the upper nest for receiving the positioning column;

when the wheel frame assembly is opened, the positioning column is located inside the hole so as to lock the upper nest and the lower nest with each other, and the four long rods are located in a substantially same horizontal plane forming an X shape, and each second end of each of the four long rods defines a corner of the wheel frame assembly.

3. The foldable cart of claim 2, wherein the cart has four wheels each of which is an omni-directional wheel, each wheel is adjustably mounted under the corresponding joint, a connecting cylinder having an upper end and a lower end is convexly arranged at an upper surface of a seat of each universal wheel, and the bottom of each joint has a recessed hole for receiving the connecting cylinder;

the connecting cylinder has an annular groove formed on a periphery of the upper end of the connecting cylinder, and each joint has a mounting hole formed at a position corresponding to the annular groove, a fastener passes through the mounting hole to press against the annular groove;

the connecting cylinder has a radially formed fixation hole below the annular groove, and each joint has a corresponding positioning hole on a surface of the joint, an adjustment bolt screws through the positioning hole into the fixation hole so as to direct the corresponding wheel.

4. The foldable cart of claim 2, wherein each corner of the wheel frame assembly is detachably connected to each vertical rod, and the four vertical rods are symmetrically arranged in front, rear, left and right side of the cart frame.

5. The foldable cart of claim 4, wherein the lower end of the vertical rod has a chuck, the wheel frame assembly is detachably connected to the vertical rod through the cooperation of the joint and the chuck, a T-shaped guide rail is longitudinally formed at an upper portion of the surface of the joint, a lower portion of the surface of the joint is slotted to form a strip-shaped plate with certain elasticity, and a buckle is convexly arranged in a middle portion of the strip-shaped plate, an inner wall of the chuck has a guide slot which slides to fit with the T-shaped guide rail, and an inner wall of the guide slot has a recessed clamping slot which fits to the buckle, the chuck inserts with the joint by sliding the guide slot and the T-shaped guide rail together, and the chuck connects to the joint when the clamping slot attaches to the buckle.

6. The foldable cart of claim 5, wherein a slider that can slide along the vertical rod is sleeved on each vertical rod, the drawing rod has an upper end, a middle portion and a lower end, the middle portion of the two drawing rods on the same side are pivotally attached to each other, the upper end of the drawing rod is pivotally attached to the slider, while the lower end thereof is pivoted to the chuck at the lower end of the opposite corresponding vertical rod, and, a limiting block for limiting the downward movement of each slider is mounted on each vertical rod.

7. The foldable cart of claim 5, wherein the handle assembly comprises a handle, a telescopic rod having a top, a center block and two pull rods having an upper end and a lower end, the telescopic rod penetrates through a center of the center block in such a way that the telescopic rod is able to slide through the center block, the handle is arranged on the top of the telescopic rod, each chuck at the lower end of the corresponding vertical rod on the front side or the rear side of the foldable cart is pivotally attached to an adaptor, and, the lower end of each pull rod is pivotally attached to the corresponding adaptor, while the upper end thereof is pivotally attached to the center block.

8. The foldable cart of claim 7, wherein the center block is a rectangular block with openings corresponding to each pull rod, there are two telescopic rods arranged parallel to each other, a middle of the center block has a through hole for allowing the telescopic rods to pass and slide therethrough, a block resisted against each opening is arranged at the lower ends of the telescopic rods, each opening for allowing the upper end of the pull rod to be inserted is concavely formed on each side of the center block, and the upper end of each pull rod is inserted into the corresponding opening to be pivotally connected to the center block.

9. The foldable cart of claim 8, wherein each adaptor is rotatably connected to the corresponding chuck at the lower portion of the surface of the chuck on the vertical rods located on the front side or rear side of the cart frame, a side of each adaptor has a U-shaped notch for allowing the lower end of the corresponding pull rod to be inserted, the lower end of each pull rod is inserted into the corresponding U-shaped notch to be pivotally connected to the adaptor, the handle having an upper end and a lower end is a C-shaped block, the lower end of the handle has insertion holes for allowing the upper ends of the two telescopic rods to be inserted, and, the handle is fixed to the telescopic rods through a fixation member.

10. The foldable cart of claim 1, wherein the storage bag is detachably connected to the vertical rods to form a storage assembly within which the wheel frame assembly can be contained when the wheel frame assembly is detached from the vertical rods and folded.

\* \* \* \* \*